(12) United States Patent
Chun

(10) Patent No.: US 10,845,577 B2
(45) Date of Patent: Nov. 24, 2020

(54) WIDE ANGLE LENS ASSEMBLY AND CAMERA OBJECTIVE

(71) Applicant: TH Swiss AG, Baar (CH)

(72) Inventor: Youngse Chun, Incheon-si (KR)

(73) Assignee: TH Swiss AG, Baar (CH)

( * ) Notice: Subject to any disclaimer, the term of this patent is extended or adjusted under 35 U.S.C. 154(b) by 114 days.

(21) Appl. No.: 16/079,219

(22) PCT Filed: Mar. 13, 2017

(86) PCT No.: PCT/EP2017/055762
§ 371 (c)(1),
(2) Date: Aug. 23, 2018

(87) PCT Pub. No.: WO2017/157812
PCT Pub. Date: Sep. 21, 2017

(65) Prior Publication Data
US 2019/0086648 A1   Mar. 21, 2019

(30) Foreign Application Priority Data

Mar. 18, 2016   (EP) ..................................... 16161222

(51) Int. Cl.
| | | |
|---|---|---|
| *G02B 13/18* | (2006.01) | |
| *G02B 9/12* | (2006.01) | |
| *G02B 13/06* | (2006.01) | |
| *G02B 9/64* | (2006.01) | |
| *G02B 13/04* | (2006.01) | |
| *G02B 27/00* | (2006.01) | |

(52) U.S. Cl.
CPC .............. *G02B 13/06* (2013.01); *G02B 9/64* (2013.01); *G02B 13/04* (2013.01); *G02B 27/0025* (2013.01)

(58) Field of Classification Search
CPC .......... G02B 13/06; G02B 9/64; G02B 13/04; G02B 27/0025
USPC ................ 359/717, 725, 753, 793, 716, 784
See application file for complete search history.

(56) References Cited

U.S. PATENT DOCUMENTS

2001/0013973 A1   8/2001   Bos
2005/0219715 A1   10/2005   Kimura et al.
(Continued)

FOREIGN PATENT DOCUMENTS

JP   2011-227351 A   11/2011

OTHER PUBLICATIONS

International Search Report Corresponding to PCT/EP2017/055762 dated May 4, 2017.
(Continued)

*Primary Examiner* — William Choi
(74) *Attorney, Agent, or Firm* — Davis & Bujold PLLC; Michael J. Bujold

(57) ABSTRACT

A wide angle lens assembly (1) for a camera. The assembly comprises a first group (2) and a second group (3) of lenses. The first group (2) is adapted to be arranged closer to an iris of the camera than the second (3) group. The first group (2) comprises multiple, preferably five, lenses with a negative refractivity and the second group (3) comprises at least three, preferably cemented, lenses (5) and at least one aspherical lens (6). The first group (2) comprises one aspherical lens (7) spaced furthest from the other lenses of the first group (2) and adapted to be arranged further away from the iris than the other lenses of the first group (2).

16 Claims, 4 Drawing Sheets

(56) References Cited

U.S. PATENT DOCUMENTS

Figure 1:
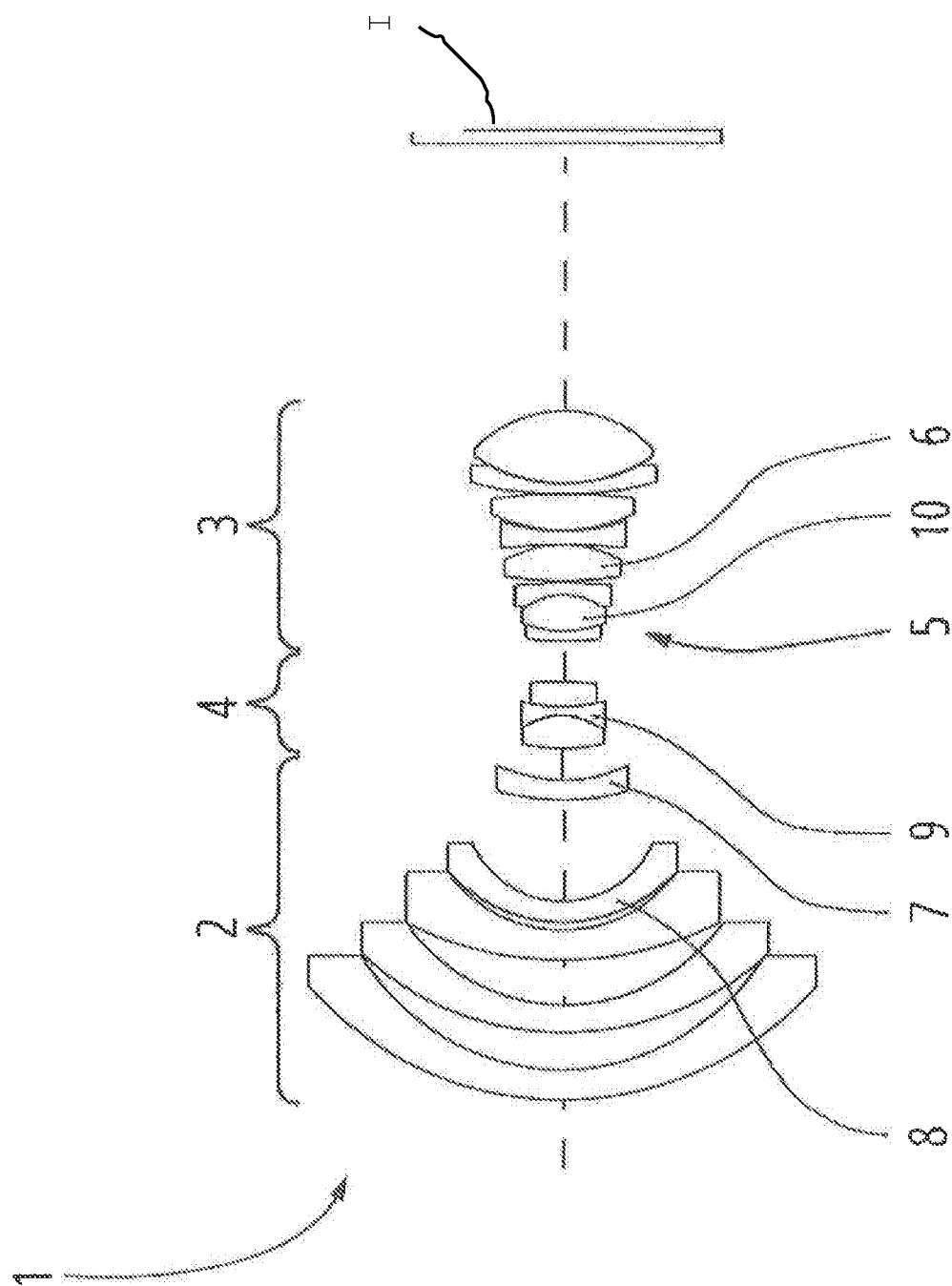

2011/0109974 A1  5/2011  Sato
2015/0146085 A1  5/2015  Hatada

OTHER PUBLICATIONS

Written Opinion Corresponding to PCT/EP2017/055762 dated May 4, 2017.

WIDE ANGLE LENS ASSEMBLY AND CAMERA OBJECTIVE

The present invention is directed to wide angle lens assemblies and camera objectives especially as claimed in the independent claims.

Wide angle lens assemblies generally comprise a first lens group with a negative focal length. A second lens group of the assembly has a positive focal length. Besides meniscus lenses, the assemblies need at least one aspherical lens to correct aberration.

US 2011/0109974 suggests to arrange an aspherical lens as the second lens in the first group. Such an arrangement demands a relatively large aspherical lens. As aspherical lenses are expansive to produce, such a system results in relatively high production costs.

It is an object of the present invention to overcome the drawbacks of the state of the art, in particular it is an object to provide a lens assembly which can be produced cost efficiently and which nevertheless provides a reliable aberration correction.

The objects are solved with the invention as defined in the claims, in particular with a wide angle lens assembly for a camera, comprising a first group and a second group of lenses. The first group is adapted to be arranged closer to an iris of the camera than the second group. The first group comprises multiple, preferably five, lenses with a negative focal length. The second group comprises at least three lenses, which are preferably cemented and at least one aspherical lens. The first group comprises one aspherical lens distanced from the other lenses of the first group adapted to be arranged further away from the iris than the other lenses of the first group.

By arranging the aspherical lens distanced from the other lenses, at least the diagonal size of the aspherical lens can be reduced. Therewith, less material is needed, manufacturing is easier and costs can be reduced. Preferably, also a size orthogonal to the diagonal size of the aspherical lens can be reduced by arranging the aspherical lens distanced from the other lenses.

The aspherical lens in the second group is used to correct high order aberration.

The lenses of the first group have a negative focal length. The lenses of the second group have a positive focal length.

Preferably, the aspherical lens of the first group is distanced such that the diagonal size of the aspherical lens is equal to or less than half the diagonal size of an image sensor of the system with which the assembly will be used. Therewith, the costs of the assembly can be further reduced.

The surface (directed away from the iris) of the aspherical lens of the first group is preferably distanced by about 30-40 mm, more preferably about 34.5 mm from a the surface (directed to the iris) of the lens of the first group closest to the iris, when the focus is set to infinity.

Therewith, the costs can be further reduced.

In a preferred embodiment, the first group comprises a second aspherical lens. The second aspherical lens is preferably arranged closest to the distanced aspherical lens.

Preferably, the distanced aspherical lens comprises two aspherical surfaces. The second aspherical lens comprises preferably only one aspherical surface. The aspherical surface of the second aspherical lens is preferably pointing towards the distanced aspherical lens.

An aspherical lens comprising only one aspherical surface is cheaper in production than an aspherical lens comprising two aspherical surfaces.

As the non-distanced aspherical lens of the first group preferably comprises only one aspherical lens, the costs are kept relatively low.

With a second aspherical lens the aberration can be more accurately corrected. By arranging the second aspherical lens closest to the other aspherical lens, the diagonal size of the second aspherical lens can be kept at a minimum. Therewith, the additional costs are kept at a minimum.

The first group is preferably adapted to be fixedly arranged with respect to the iris.

By arranging the first group fixedly with respect to the iris, the aspherical lens(es) is arranged at a constant distance with respect to the iris.

If the first group is not fixedly arranged, the image height of a principal ray and a lens aperture tends to be bigger. Therewith, the aspherical lens also has to be bigger in order to correct the aberration. By arranging the first group fixedly with respect to the iris, the size and therewith the costs of the aspherical lens can be further reduced.

Preferably, the second group is adapted to be moveably arranged with respect to the iris such that a focus is adjustable by moving the second group with respect to the iris.

To adjust the focus, lenses have to be axially moved. By making the second group moveable with respect to the iris, the size of the aspherical lens can be reduced.

Preferably, the second group further comprises four extra lenses. The aspherical lens of the second group is preferably arranged between the three preferably cemented lenses and the four extra lenses.

The extra lenses correct the remaining aberration. An arrangement with three cemented lenses, four extra lenses and an aspherical lens has been shown to efficiently correct high order aberration and the remaining aberration.

Preferably, a middle lens of the preferably three cemented lens of the second group is biconvex.

Alternatively, the middle lens might be biconcave.

The biconvex lens in the middle allows a close arrangement of the three lenses. In wide angle assemblies, the light which has passed the first group and is incident on the second group has still a large angle. For this reason the second group is preferably of the "negative lead type" and/or the three cemented lenses of the second group have a negative refracting power. In order to minimize chromatic aberration, both, lenses with a negative refracting power and with a positive refracting power, should be used. In this regard, the use of three cemented lenses of the second group is advantageous to minimize performance changes because of the clearance between the lenses. To distribute the refracting power equally, the positive refracting power lens is preferably arranged on the middle as a biconvex lens. Then, securing a symmetric imaging and minimizing aberration is possible.

Preferably, the assembly further comprises a third group of lenses between the first and the second group. The third group preferably comprises three cemented lenses. The third group of lenses corrects chromatic aberration.

In lens systems, chromatic aberration occurs because of different wave lengths of different colors. These different wave lengths are differently shifted by lenses. In order to correct this chromatic aberration, a third group of lenses might be present between the first and the second group of lenses.

Therewith, the colors on the image are not shifted and occur more naturally.

A middle lens of the further three cemented lenses of the third group is preferably biconcave.

The biconcave lens in the middle allows a close arrangement of the three lenses.

The two outer lenses are preferably biconvex. The use of three cemented lenses of the third group again is advantageous to minimize performance changes because of a clearance between the lenses. Cemented biconcave middle lens and biconvex outer lenses aid in securing a symmetric imaging and achieving a refracting power equally.

The lens assembly is preferably arranged such that $$0.3 \leq \frac{D_{Gasp}}{Y} \leq 0.85,$$

wherein $D_{Gasp}$ is a maximum radius among the aspherical lenses of the first group and Y is a half diagonal size of an image sensor of the system.

This is a standard setting for an assembly having an aspherical lens with a diagonal size, which is less than half of a sensor of the system. Therewith, the costs can be reduced.

$$0.3 \leq \frac{l_{Gasp}}{TL} \leq 0.75,$$

The lens assembly is preferably arranged such that wherein $l_{Gasp}$ is a distance between a surface of the distanced aspherical lens of the first group directed away from the iris and a surface directed to the iris of the lens of the first group closest to the iris, when the system is set to an infinity focus. TL is the distance between a surface directed away from the iris of the lens of the system arranged most distanced from the iris and said surface of said lens of the first group closest to the iris, when the focus is set to infinity. The smaller $l_{Gasp}$ is, the smaller the aspherical lens can be designed.

The lens assembly is preferably arranged such that $$-1.1 \leq \frac{f_{G1,trplet}}{f_{G2,trplet}} \leq -0.9,$$

wherein $f_{G1,trplet}$ is a focal length of the three lenses closest to the iris of the first group and $f_{G2,trplet}$ is a focal length the three lenses closest to the iris of the second group.

The formula describes a focal length rate for the three cemented lenses closest to the iris of the first group and second group.

With a focal length rate close to 1, the symmetric imaging is secured around the iris. Therewith, the chromatic aberration and distortion is easily corrected.

The lens assembly is preferably arranged such that $$1.0 \leq \frac{f_{G2,asp}}{f_{G2}} \leq 1.5,$$

wherein $f_{G2,asp}$ is a focal length of the aspherical lens of the second group and $f_{G2}$ is a focal length of the second group as a whole.

With the preferred ratio, the aspherical lens of the second group takes all refracting power of the second group. The aspherical lens can correct all remaining aberration except for a chromatic aberration.

The invention is also directed to a camera objective comprising an iris and a lens assembly as described herein The objective with a lens assembly as described herein provides the advantages of the assemblies described herein.

The description is in the following described with reference to schematic drawings, which show non-limiting examples of the invention.

Figure 2:
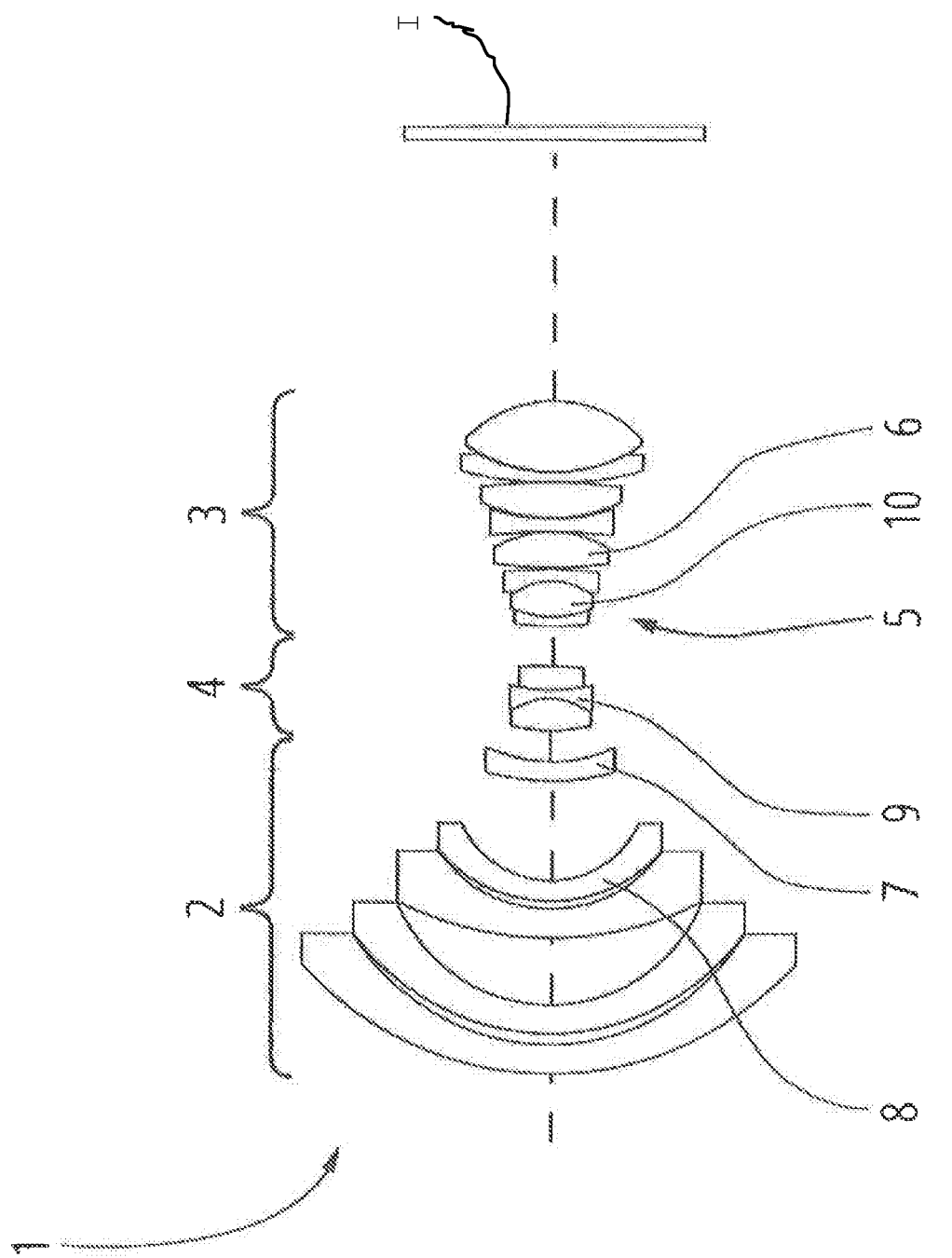
Figure 3A:
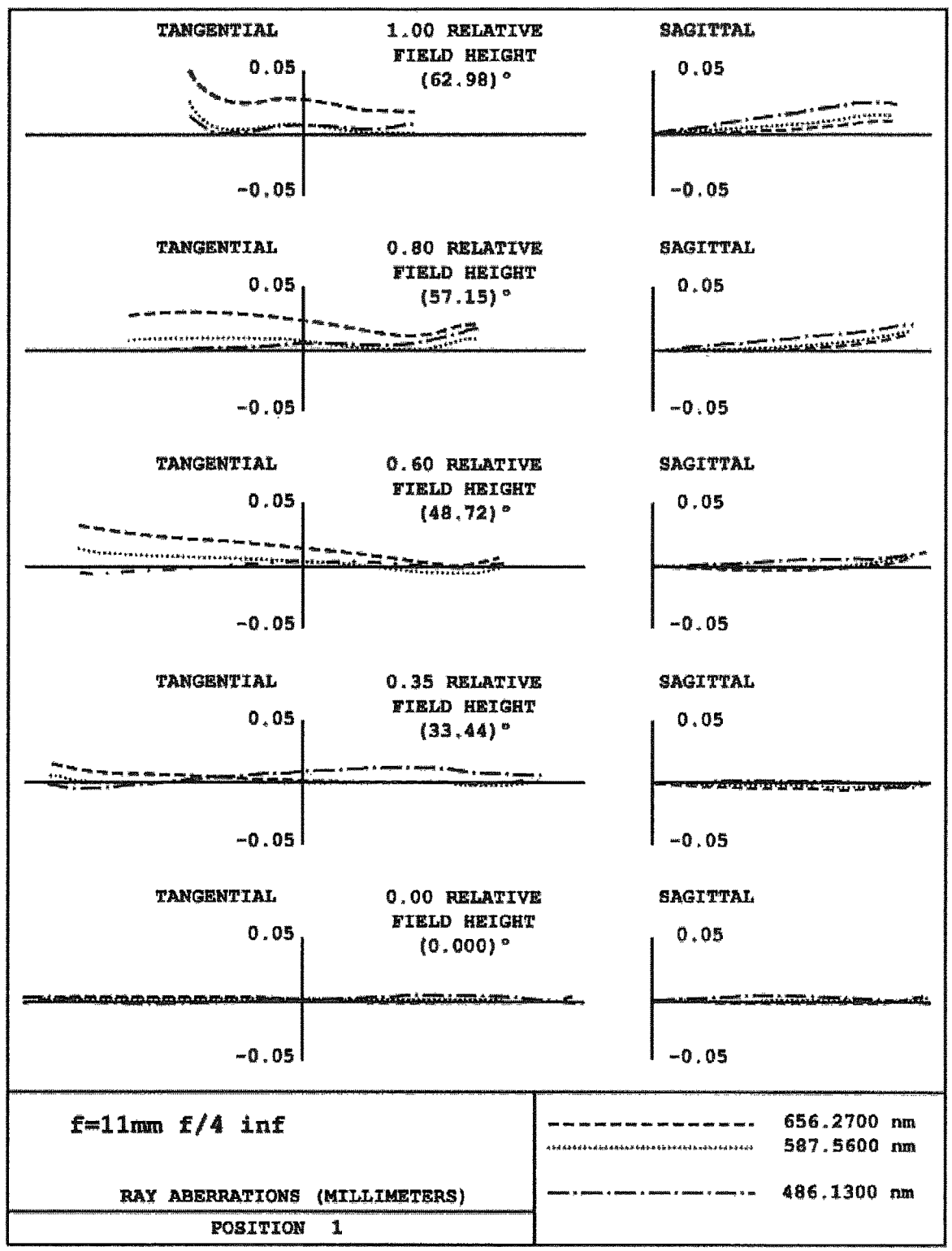
Figure 3B:
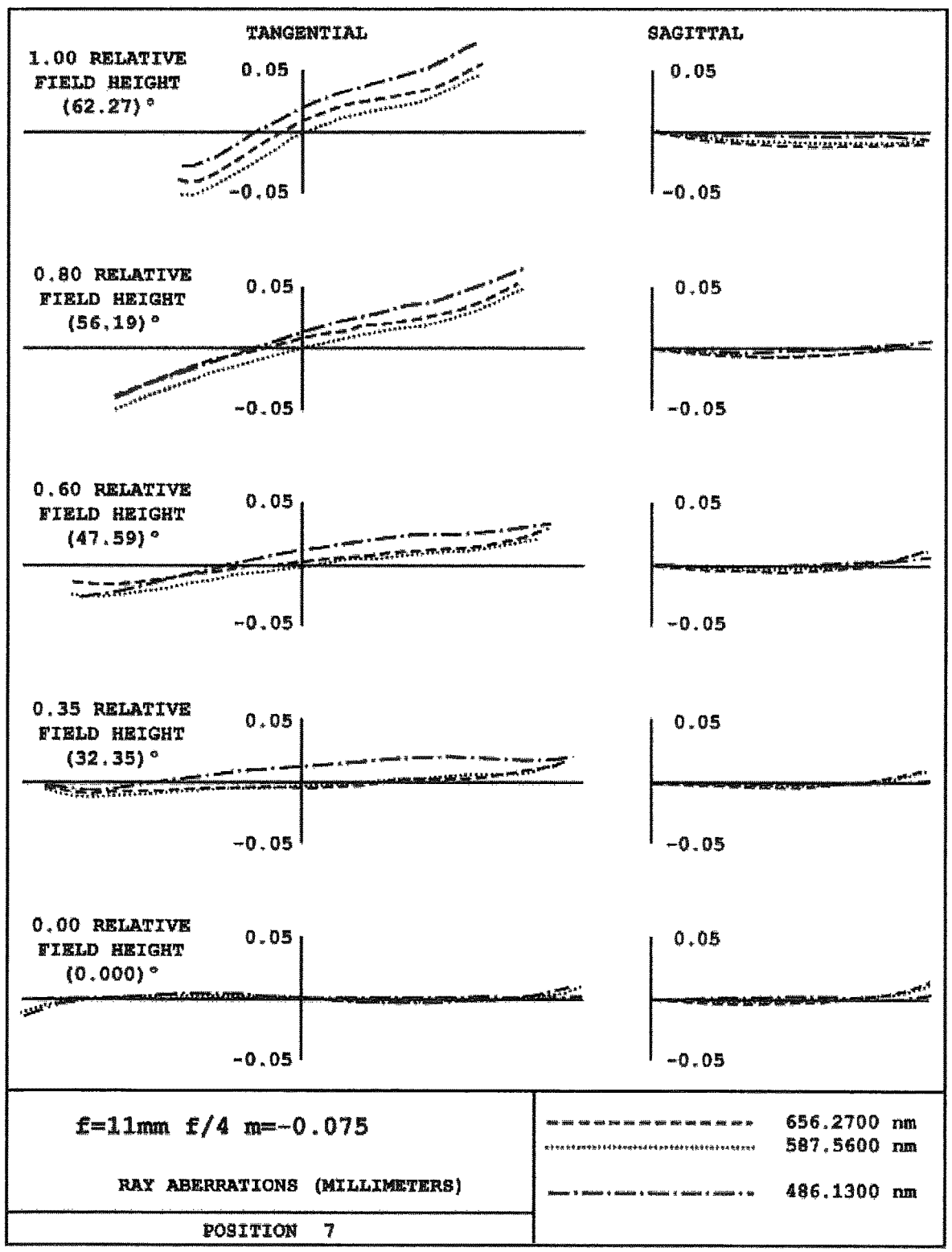

The figures schematically show:
FIG. 1: A lens assembly according to the invention;
FIG. 2: An alternative lens assembly according to the invention;
FIG. 3a: A Ray Fan of the embodiment of FIG. 1 at infinity;
FIG. 3b: A Ray Fan of the embodiment of FIG. 1 with a magnification of −0.075.

FIG. 1 shows a wide angle lens assembly 1 according to the invention. The assembly comprises a first group 2, a second group 3 and a third group 4 of lenses. The first group 2 is arranged closest to an iris (not shown) in an objective and furthest away from the image plane or image sensor I. The second group 3 is arranged most distanced to the iris in an objective.

The first group 1 comprises five lenses. The lenses of the first group 2 have a negative focal length. Four lenses are arranged close to each other. One fifth lens 7 comprises two aspherical surfaces and is arranged distanced from the other four lenses. The lens 8 closest to the distanced aspherical lens 7 of the other four lenses comprises one aspherical surface facing the distanced aspherical lens 7. The aspherical lenses correct aberration.

The second group 3 of lenses comprises three cemented lenses 5 as a first sub-group coming from the iris side. The lenses of the second group 3 have a positive focal length. The middle lens 10 of the three cemented lenses is biconvex. The cemented lens 3 are adapted to correct high order aberration. The second group 3 further comprises an aspherical lens 6 next to the three cemented lenses 5. Four additional lenses are arranged on the other side of the aspherical lens 6 to correct any remaining aberration.

The third group 4 comprises three cemented lenses. A middle lens 9 of the three lenses is biconcave. The three lenses are adapted to correct chromatic aberration.

In use, the second group 3 is movable with respect to the iris in order to adjust a focus. The first group 2 is fixedly arranged with respect to the iris.

The distance between the surface (directed away from the iris) of the distanced aspherical lens 7 and the surface (directed towards the iris) of the lens of the first group closest to the iris is 34.3 mm.

TABLE 1

Specifications of embodiment 1.
Typical specifications of the assembly of FIG. 1
are disclosed in the following tables.

| Obj | Radius infinity | Thick D0 | nd | vd |
|---|---|---|---|---|
| 1 | 53.12 | 4.5 | 1.516800 | 64.17 |
| 2 | 35.36 | 5.2 | | |
| 3 | 44.31 | 4 | 1.846660 | 23.78 |
| 4 | 27.63 | 5.6 | | |
| 5 | 40.03 | 5 | 1.516800 | 64.17 |
| 6 | 20.4 | 3.15 | | |
| 7 | 22.8 | 3 | 1.689000 | 52.8 |
| 8* | 10.38 | 14.3 | | |
| 9* | 38.762 | 3 | 1.689000 | 52.8 |
| 10* | 22.614 | 4.6 | | |
| 11 | 24.771 | 5 | 1.592700 | 35.45 |
| 12 | −10.29 | 1.5 | 1.772500 | 49.62 |
| 13 | 22.86 | 3.4 | 1.717360 | 29.5 |
| 14 | −65.65 | 2.5 | | |
| 15(stop) | infinity | D1 | | |
| 16 | 57.82 | 1.5 | 1.903660 | 31.31 |
| 17 | 11.89 | 5.3 | 1.717360 | 29.5 |
| 18 | −12.14 | 1.5 | 1.903660 | 31.31 |
| 19 | infinity | 0.3 | | |
| 20* | 31.365 | 5.9 | 1.689000 | 52.8 |
| 21* | −14.263 | 0.3 | | |
| 22 | −44.25 | 1.6 | 1.903660 | 31.31 |
| 23 | 23.45 | 5.4 | 1.438750 | 94.96 |

TABLE 1-continued

Specifications of embodiment 1.
Typical specifications of the assembly of FIG. 1
are disclosed in the following tables.

| Obj | Radius infinity | Thick D0 | nd | vd |
|---|---|---|---|---|
| 24 | −158.5 | 0.3 | | |
| 25 | 59.81 | 1.6 | 1.903660 | 31.31 |
| 26 | 26.41 | 10.6 | 1.456500 | 90.27 |
| 27 | −20.07 | 38 | | |
| 28 | infinity | D2 | | |
| 29 | infinity | 2.5 | 1.516800 | 64.17 |
| 30 | infinity | D3 | | |
| img | infinity | D4 | | |

The objective numbers the surfaces of the different lenses starting on the surface of the first group 2 arranged closest the iris in an objective. The *-symbol indicates aspherical surfaces. Hence, numbers 1-10 are members of the first group 2, numbers 11-15 are members of the third group 4, and numbers 16-30 are members of the second group 3.

"nd" is the refractive index of the material.
"vd" is the Abbe number.

TABLE 2

Zoom data and aspherical coefficient of embodiment 1.
The aspherical coefficients of the aspherical surfaces of the embodiment of FIG. 1 are the following:

| | K | A | B | C | D |
|---|---|---|---|---|---|
| 8* | −1.16357 | | | | |
| 9* | 2.91586 | −6.96482E−05 | 1.07311E−06 | −5.11962E−09 | 5.49903E−12 |
| 10* | 0.05500 | −5.63447E−05 | 1.17687E−06 | −6.04906E−09 | −3.52658E−11 |
| 20* | 2.76265 | −2.69072E−05 | 2.03146E−07 | −2.62322E−09 | 7.12078E−12 |
| 21* | −2.67095 | −5.35187E−05 | 2.89171E−07 | −9.97322E−10 | −4.96553E−12 |

The zoom data of the embodiment of FIG. 1 are the following for different zooms

| | m = 0 | m = −0.075 |
|---|---|---|
| EFL/MAG | 11.5 | 0.075 |
| FOV | 62.98 | 62.269 |
| F/# | 4.002 | 4.181 |
| D0 | Infinity | 128.60360 |
| D1 | 4.20000 | 2.64163 |
| D2 | 0.30000 | 1.85837 |
| D3 | 0.50001 | 0.50001 |
| D4 | 0.00840 | 0.06879 |

The distance between second and third lens on embodiment 2 is longer than the distance between second and third lens on embodiment 1.

TABLE 3

RDN data of embodiment 2
The specifications of the embodiment of FIG. 2 are therefore different:

| S# obj | Radius infinity | Thick D0 | nd | vd | Note |
|---|---|---|---|---|---|
| 1 | 51.085 | 4.50 | 1.516800 | 64.2 | Group 1 |
| 2 | 35.751 | 1.98 | | | |
| 3 | 37.644 | 4.00 | 1.846660 | 23.78 | |
| 4 | 25.400 | 10.31 | | | |
| 5 | 50.872 | 4.50 | 1.516800 | 64.2 | |
| 6 | 21.453 | 1.08 | | | |
| 7 | 22.800 | 3.00 | 1.689000 | 52.8 | |
| 8* | 10.381 | 15.15 | | | |
| 9* | 38.762 | 3.00 | 1.689000 | 52.8 | |
| 10* | 22.614 | 4.51 | | | |
| 11 | 22.404 | 5.00 | 1.592700 | 35.45 | |
| 12 | −10.328 | 1.50 | 1.772500 | 49.62 | |
| 13 | 23.944 | 3.40 | 1.717360 | 29.5 | |
| 14 | −124.212 | 2.00 | | | |
| 15(stp) | infinity | D1 | | | |
| 16 | 54.249 | 1.50 | 1.903660 | 31.31 | Group 2 |
| 17 | 11.817 | 5.30 | 1.717360 | 29.5 | |
| 18 | −12.523 | 1.50 | 1.903660 | 31.31 | |
| 19 | infinity | 0.10 | | | |
| 20* | 31.365 | 5.90 | 1.689000 | 52.8 | |
| 21* | −14.263 | 0.18 | | | |
| 22 | −43.893 | 1.60 | 1.903660 | 31.31 | |
| 23 | 26.242 | 5.40 | 1.438750 | 94.96 | |
| 24 | −235.496 | 0.10 | | | |
| 25 | 53.239 | 1.60 | 1.903660 | 31.31 | |
| 26 | 24.371 | 10.60 | 1.456500 | 90.27 | |
| 27 | −20.310 | D2 | | | |
| 28 | infinity | 2.50 | 1.516800 | 64.2 | Filter |
| 29 | infinity | D3 | | | |
| img | infinity | D4 | | | |

TABLE 4

Zoom data and aspherical coefficients of embodiment 2.

Aspherical coefficients:

| K | A | B | C | D | E |
|---|---|---|---|---|---|
| 8* | −1.16357 | 0.00000E+00 | 0.00000E+00 | 0.00000E+00 | 0.00000E+00 |
| 9* | 2.91586 | −6.96482E−05 | 1.07311E−06 | −5.11962E−09 | 5.49903E−12 |
| 10* | 0.05500 | −5.63447E−05 | 1.17687E−06 | −6.04906E−09 | −3.52658E−11 |
| 20* | 2.76265 | −2.69072E−05 | 2.03146E−07 | −2.62322E−09 | 7.12078E−12 |
| 21* | −2.67095 | −5.35187E−05 | 2.89171E−07 | −9.97322E−10 | −4.96553E−12 |

Zoom Data:

|  | m = 0 | m = −0.075 |
|---|---|---|
| EFL/MAG | 11.4752 | 0.07533 |
| FOV | 62.888 | 61.52 |
| F/# | 4.01 | 4.307 |
| D0 | infinity | 132.31819 |
| D1 | 4.13851 | 1.81749 |
| D2 | 38.01266 | 40.33367 |
| D3 | 0.54100 | 0.44489 |
| D4 | −0.04100 | 0.05511 |

TABLE 5

Comparison of embodiments.
A comparison of the embodiment of FIG. 1 and FIG. 2 is shown in the table below:

|  | Embodiment 1 | Embodiment 2 |
|---|---|---|
| $D_{Gasp}$: maximum radius of first group 2 including aspherical lens 7 | 16.82 | 17.25 |
| Y: half diagonal size of image sensor | 21.7 | 21.7 |
| $l_{Gasp}$: distance between a surface of the distanced aspherical lens 7 of the first group 2 directed away from the iris and a surface directed to the iris of the lens of the first group 2 closest to the iris when the focus is set to infinity. | 34.3 | 34.559 |
| TL: distance between a surface directed away from the iris of the lens of the assembly 1 arranged most distanced from the iris and the surface of the lens of the first group 2 closest to the iris when the focus is set to infinity. | 103.25 | 101.84 |
| $f_{G1,trplet}$: focal length of three cemented lenses closest to the iris of the first group 2 | 63.271 | 72.111 |
| $f_{G2,trplet}$: focal length of three cemented lenses 5 closest to the iris of the second group 3 | −66.43 | −73.648 |
| $f_{G2,asp}$: Focal length of the aspherical lens 6 of the second group 3 | 14.957 | 14.957 |
| $f_{G2}$: Focal length of the second group 3 as a whole | 29.783 | 28.529 |
| Formula (1) $0.3 \leq \dfrac{D_{Gasp}}{Y} \leq 0.85$ | 0.33 | 0.34 |
| Formula (2) $0.3 \leq \dfrac{l_{Gasp}}{TL} \leq 0.75$ | 0.70 | 0.70 |
| Formula (3) $-1.1 \leq \dfrac{f_{G1,trplet}}{f_{G2,trplet}} \leq -0.9$ | −0.95 | −0.98 |
| Formula (4) $1.0 \leq \dfrac{f_{G2,asp}}{f_{G2}} \leq 1.5$ | 0.50 | 0.52 |

3a shows the Ray Fan on infinity and magnification of −0.075 of embodiment 1. 3b shows the Ray Fan on infinity and magnification of −0.075 of embodiment 2.

The invention claimed is:

1. A wide angle lens assembly for a camera comprising:
a first group of lenses, and
a second group of lenses,
wherein the first group is adapted to be arranged furthest away from an image plane of the camera than the second group,
the first group comprises five lenses, and each of the lenses of the first group of lenses has a negative refractivity,
the second group comprises at least three lenses and at least one aspherical lens,
the first group comprises one aspherical lens distanced from the other lenses of the first group and adapted to be arranged closer to the image plane than the other lenses of the first group, and
the lens assembly comprises a third group of lenses which comprises three cemented lenses, located between the first group and the second group, to correct chromatic aberration.

2. The lens assembly according to claim 1, wherein the aspherical lens of the first group is distanced such that a diagonal size of the aspherical lens is equal to or less than half a diagonal size of the image plane of the camera with which the assembly will be used.

3. The lens assembly according to claim 1, wherein the first group comprises a second aspherical lens.

4. The lens assembly of claim 3, wherein the second aspherical lens is arranged closest to the distanced aspherical lens.

5. The lens assembly according to claim 1, wherein the first group is adapted to be fixedly arranged with respect to the image plane.

6. The lens assembly according to claim 1, wherein the second group is adapted to be moveably arranged with respect to the image plane such that a focus is adjustable by moving the second group with respect to the image plane.

7. The lens assembly of claim 6, wherein a middle lens of the lenses of the second group is biconvex.

8. The lens assembly according to claim 1, wherein the second group further comprises four extra lenses, and the aspherical lens of the second group is arranged between three lenses and the four extra lenses.

9. The lens assembly according to claim 1, wherein a middle lens of lenses of the third group is biconcave.

10. The lens assembly according to claim 1, wherein $$0.3 \leq \frac{D_{Gasp}}{Y} \leq 0.85,$$

wherein $D_{Gasp}$ is a maximum radius of the lenses of the first group and Y is a half diagonal size of the image plane of the camera.

11. The lens assembly according to claim 1, wherein $$0.3 \leq \frac{l_{Gasp}}{TL} \leq 0.75,$$

wherein $l_{Gasp}$ is a distance between a surface of the distanced aspherical lens of the first group directed toward the image plane and a surface directed away from the image plane of the lens of the first group furthest away from the image plane, when the camera is set to an infinity focus, and TL is the distance between a surface directed toward the image plane of the lens of the camera arranged closest to the image plane and said surface of said lens of the first group furthest from the image plane, when the focus is set to infinity.

12. The lens assembly according to claim 1, wherein $$-1.1 \leq \frac{f_{G1,triplet}}{f_{G2,triplet}} \leq -0.9$$

wherein $f_{G1,trplet}$ is a focal length of the three lenses furthest from the image plane of the first group and $f_{62,trplet}$ is a focal length the three lenses furthest from the image plane of the second group.

13. The lens assembly according to claim 1, wherein $$1.0 \leq \frac{f_{G2,asp}}{f_{G2}} \leq 1.5,$$

wherein $f_{G2,asp}$ is a focal length of an aspherical lens of the second group and $f_{G2}$ is a focal length of the second group as a whole.

14. A camera objective comprising the image plane and a lens assembly according to claim 1.

15. The lens assembly of claim 1, wherein the first group comprises five lenses with a negative refractivity.

16. The lens assembly of claim 1, wherein the lenses of the second group are cemented lenses.

* * * * *